US012758444B2

(12) United States Patent
Bronen et al.

(10) Patent No.: US 12,758,444 B2
(45) Date of Patent: Oct. 13, 2026

(54) TOILET LIFT WITH INTELLIGENT MONITORING

(71) Applicant: SedMed Inc., Woodbridge, CT (US)

(72) Inventors: Jeremy Bronen, Woodbridge, CT (US); Matan Cutler, New Haven, CT (US); Matthew Iannone, Prospect, CT (US); Kayla Tolliver-Van Wright, Danbury, CT (US); Joshua Badgley, Southington, CT (US); David Uland, Woodbridge, CT (US)

(73) Assignee: SedMed Inc., Woodbridge, CT (US)

( * ) Notice: Subject to any disclaimer, the term of this patent is extended or adjusted under 35 U.S.C. 154(b) by 105 days.

(21) Appl. No.: 18/941,917

(22) Filed: Nov. 8, 2024

(65) Prior Publication Data

US 2026/0115069 A1 Apr. 30, 2026

Related U.S. Application Data

(60) Provisional application No. 63/598,002, filed on Nov. 10, 2023.

(51) Int. Cl.

| | |
|---|---|
| ***A61G 7/02*** | (2006.01) |
| ***A47K 13/10*** | (2006.01) |
| ***G08B 21/04*** | (2006.01) |

(52) U.S. Cl.

CPC ................ *A61G 7/02* (2013.01); *A47K 13/10* (2013.01); *A47K 13/105* (2013.01); *G08B 21/0461* (2013.01)

(58) Field of Classification Search

CPC ...... A61G 7/02; A61G 15/02; G08B 21/0461; G08B 21/0469; A47K 13/10; A47K 13/105

USPC .................................. 4/667, 237–240, 246.1

See application file for complete search history.

(56) References Cited

U.S. PATENT DOCUMENTS

2003/0074731 A1* 4/2003 Sumino ................ A47K 13/302 4/667

2019/0228632 A1* 7/2019 Hassey ................ G08B 21/182

* cited by examiner

*Primary Examiner* — David J Walczak

(74) *Attorney, Agent, or Firm* — Nutter McClennen & Fish LLP

(57) ABSTRACT

An assistive toilet lift of a toilet may include two or more proximity sensors mounted on a body of the assistive toilet lift; a data transmission device, and a analysis system. At least one proximity sensor is mounted above and below a toilet bowl and aimed toward a space in front of the toilet. At least one proximity sensor is configured to detect the presence and distance of a user approaching or leaving the assistive toilet lift. The data transmission device receives signals from the one or more proximity sensors and transmits those signals to the analysis system. The analysis system compares data from the one or more proximity sensors to data models of assistive toilet lift user falls to determine if a fall has likely occurred. The analysis system communicates with one or more of caregivers or emergency services in response to the analysis system predicts a fall event.

14 Claims, 9 Drawing Sheets

TOILET LIFT WITH INTELLIGENT MONITORING

CROSS-REFERENCE TO RELATED APPLICATIONS

This patent application claims priority from U.S. Provisional Patent Application No. 63/598,002, filed Nov. 10, 2023, entitled TOILET LIFT WITH INTELLIGENT MONITORING and naming Jeremy Bronen, Matan Cutler, Matthew Iannone, Kayla Tolliver-Van Wright, Joshua Badgley, and David Uland as inventors, the disclosure of which is incorporated herein, in its entirety, by reference.

FIELD

Illustrative embodiments of the invention generally relate to a toilet-based apparatus for user assistance, and more particularly various embodiments of the invention relate to an intelligent assisted lift system for a toilet.

BACKGROUND

This disclosure relates generally to bathroom monitoring devices, and more particularly to a device mounted on assistive toilet lifts. Assistive toilet lifts play a crucial role in supporting individuals with mobility challenges during toilet usage. Many people, including those who have muscle weakness or injuries, use a toilet lift to be able to safely sit down and stand up when using the toilet. Studies have found that for individuals ages 85 and older, over 50% of falls occur within the bathroom. Due to their mobility and balance impairments, individuals who rely on a toilet lift are also more likely to fall in the restroom than individuals who do not require a toilet lift. Additionally, elderly individuals will often have greater difficulty recovering from fall-associated injuries.

SUMMARY OF VARIOUS EMBODIMENTS

Exemplary embodiments of the disclosure include systems, methods, techniques and apparatuses for an assistive toilet lift. Further embodiments, forms, objects, features, advantages, aspects and benefits of the disclosure shall become apparent from the following description and drawings.

In accordance with one embodiment of the invention, an apparatus includes a gas spring-powered assistive toilet lift apparatus may incorporate one or more proximity sensors to monitor user motion data in the toilet area, and an accelerometer to monitor lift speed and motion. The collected data is transmitted to an analysis system, enabling communication with caregivers and/or emergency services during fall events. The analysis system also provides lift speed information, prompts users when adjustment of lift force is recommended, allows remote gas spring force settings identification and adjustment, and tracks toilet usage for improved hygiene and caregiver support. This intelligent monitoring and communication system enhances safety and usability for individuals with mobility challenges.

In accordance with other embodiments, one or more of the proximity sensors may be an infrared proximity sensor.

In accordance with other embodiments, the assistive toilet lift may be regeneratively powered.

In accordance with other embodiments, the assistive toilet lift may be regeneratively powered by a gas spring.

In accordance with other embodiments, the apparatus may include a sensor for remotely identifying a force setting of the gas spring, where the force setting is communicated to the analysis system for storage and processing.

In accordance with other embodiments, the apparatus may include a means for remotely adjusting the force setting, wherein an adjustment of the gas spring is controlled through user inputs to a user interface.

In accordance with other embodiments, the analysis system may include a 3rd party, cloud-based system.

In accordance with other embodiments, the analysis system may include local computing devices located on or near the toilet lift or a private cloud-based system.

In accordance with other embodiments, the apparatus may include an accelerometer integrated into a removable lift seat cover, where the accelerometer monitors a lifting speed of the assistive toilet lift and motion of the lift's seat cover during operation, where the data transmission device communicates the lifting speed and motion of the assistive toilet lift to the analysis system for storage and processing, and where the analysis system communicates the lifting speed to one or more of users and caregivers. In accordance with another embodiment of the invention, the analysis system may notify one or more of users and caregivers in response to one or more weight settings require adjustment as determined by the lifting speed deviating from a preset standard range.

In accordance with another embodiment of the invention, the seat cover lifting may be identified by upward acceleration detected by the accelerometer in response to the assistive toilet lift is in a default, unlocked and raised position, where the analysis system tracks and communicates data on seat cover lifting frequency as a proxy for cleaning frequency.

In accordance with another embodiment of the invention, the analysis system may track and communicate data on a user's applied force to the assistive toilet lift as determined by acceleration changes of the assistive toilet lift over time.

In accordance with another embodiment of the invention, the analysis system may track and communicate data on toilet usage, including usage frequency and duration.

In one particular embodiment, the assistive toilet lift comprises two or more proximity sensors mounted on a body of the lift, a data transmission device, and a cloud-based analysis system. In this embodiment, at least one of the proximity sensors is mounted above a toilet bowl and aimed toward a space in front of the toilet. At least another proximity sensor is mounted below the toilet bowl and aimed toward the space in front of the toilet. The sensors are configured to detect the presence and distance of a user approaching or leaving the assistive toilet lift. The data transmission device receives signals from at least one of the two or more sensors and transmits those signals to the analysis system for analysis and processing. The analysis system compares data from the at least one of the two or more sensors to data models of assistive toilet lift user falls to determine if a fall has likely occurred. The analysis system is also configured to communicate with one or more of caregivers or emergency services in response to the analysis system determining a fall has likely occurred.

In another particular embodiment, the assistive toilet lift comprises one or more proximity sensors, an accelerometer associated with a seat of the toilet lift, a data transmission device, and an analysis system comprising at least one of a computing device, server, or cloud. In this embodiment, the one or more proximity sensors is configured to detect the presence and distance of a user approaching or leaving the assistive toilet lift. The accelerometer monitors a lifting speed of the assistive toilet lift and motion of the seat during operation and is configured to share the lifting speed, motion, or a combination thereof with one or more caregivers, emergency services, or both. The data transmission device receives signals from the one or more proximity sensors and transmits those signals to the analysis system for analysis and processing. The analysis system compares data from the one or more proximity sensors to data models of assistive toilet lift user falls to determine if a fall has likely occurred. The analysis system is configured to communicate with the one or more of caregivers, emergency services, or both in response to the analysis system determining a fall has likely occurred.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

The gas spring powered assistive toilet lift apparatus with its intelligent monitoring and communication system represents a significant advancement in assistive technology. By incorporating advanced sensor technology, a wireless communication system, and user-friendly operation, the product ensures a safe, controlled, and independent toilet lift experience for individuals with mobility challenges. Its purpose-built design empowers users to carry out daily activities with dignity and autonomy, while also providing peace of mind for caregivers and loved ones. The assistive toilet lift's practicality, reliability, and focus on user needs make it a valuable addition to any bathroom, enhancing the overall quality of life for individuals facing mobility challenges.

Figure 1:
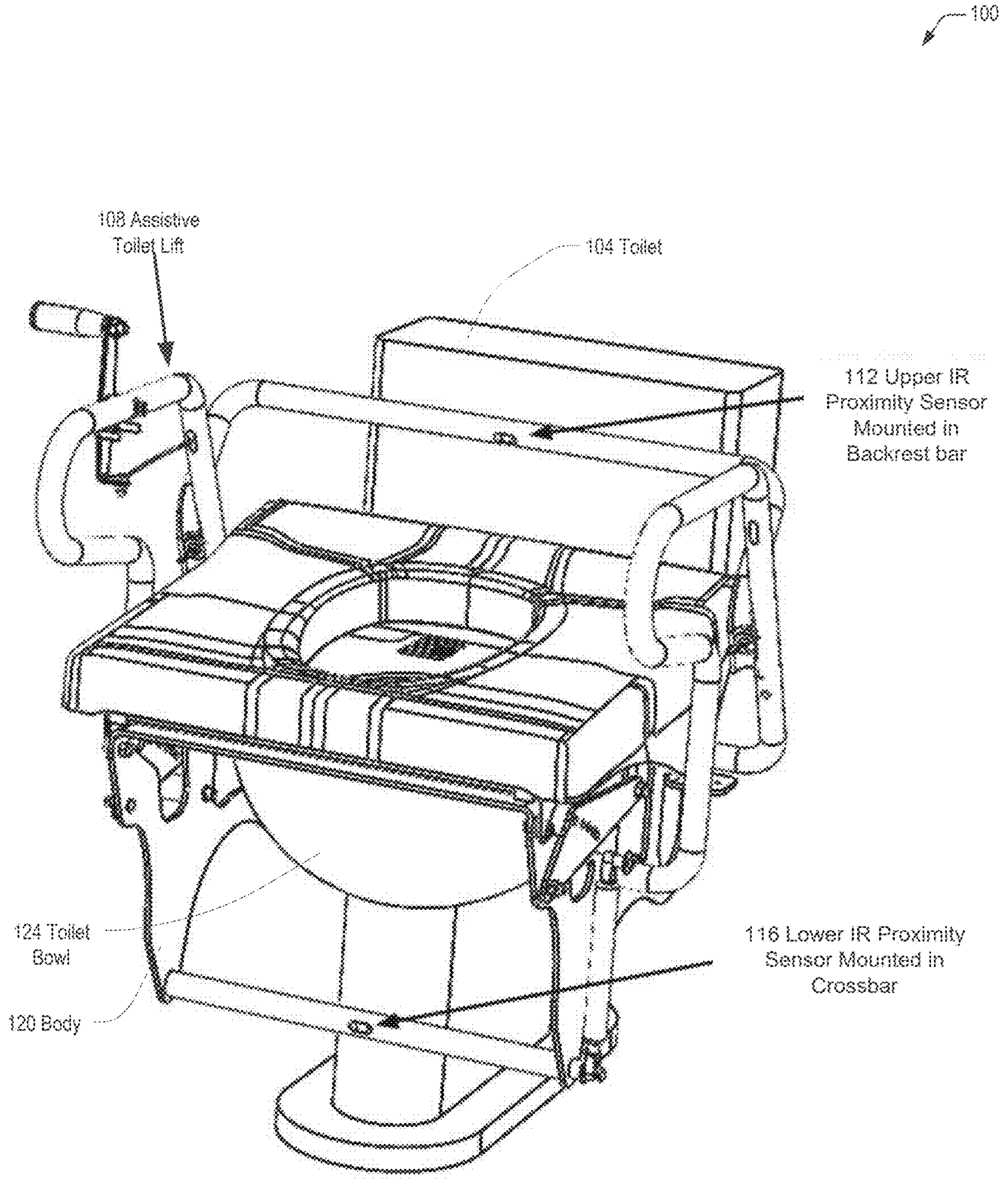
FIG. 1 schematically shows upper and lower infrared (IR) proximity sensors mounted on the body of the apparatus, in accordance with illustrative embodiments of the invention.

FIG. 1 schematically shows upper and lower infrared (IR) proximity sensors mounted on the body of the apparatus 100 in accordance with illustrative embodiments of the invention. As shown in FIG. 1, the apparatus comprises two proximity sensors 112, 116 mounted on the body 120 of the gas spring powered assistive toilet lift apparatus 108. The proximity sensors 112, 116 may include one or more optical sensors, such as an infrared (IR) sensor. The proximity sensors 112, 116 may also include an ultrasonic sensor, camera, or laser distance sensor, among other things. These proximity sensors 112, 116 are configured to detect the presence or proximity of the user approaching or leaving the lift 108.

One proximity sensor 116 may be mounted on the frame of the apparatus. In some embodiments, the sensor 116 is mounted on a rigid structure connecting the left and right lower wings. Mounted may be understood to include welding, inserting, gluing, attaching with fastener or bracket, press-fitting, among other things. This placement ensures that the sensor 116 is positioned below the rim of the toilet bowl 124 to detect users' presence in a horizontal region approximately 3-6 inches above the floor.

An additional IR proximity sensor 112 may be above the rim, such as mounted on a bar connecting the left and right handles of the apparatus 108. This sensor 112 may be placed above the toilet bowl 124 and outside the toilet lift's 108 pivoting radius to sense user presence in a horizontal region approximately two feet above the floor.

Figure 2:
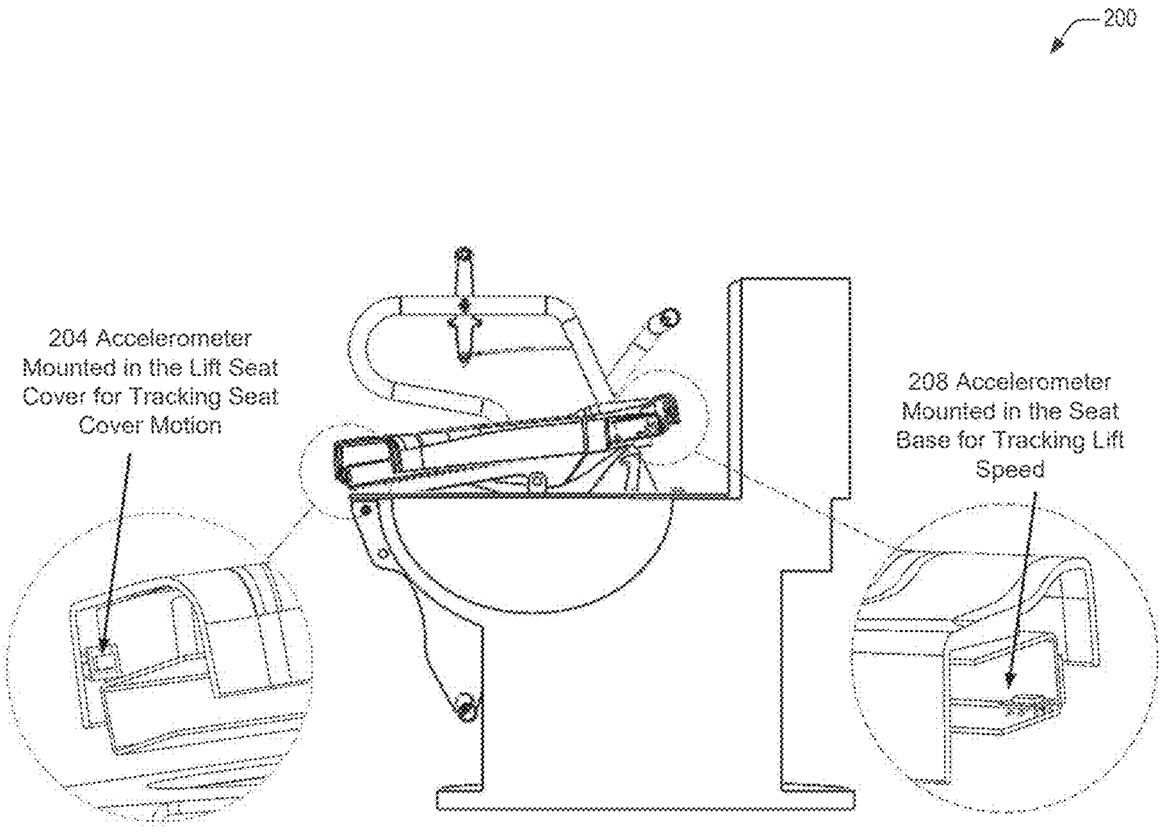
FIG. 2 schematically shows a section view of the apparatus with seat and seat cover-mounted accelerometers, in accordance with illustrative embodiments of the invention.

FIG. 2 schematically shows a section view of the apparatus 200 with seat and seat cover-mounted accelerometers in accordance with illustrative embodiments of the invention. As shown in FIG. 2, an accelerometer for measuring lift movement speed in the rear of the lift seat base 208 is shown. The lift seat base may be equipped with an accelerometer 208 to monitor lift speed and motion during operation, enhancing the safety and control of the lift mechanism 108. The seat cover may be equipped with an accelerometer 204 to monitor motion of the lift seat cover 316 as a proxy for tracking the frequency of seat cleanings.

Figure 3:
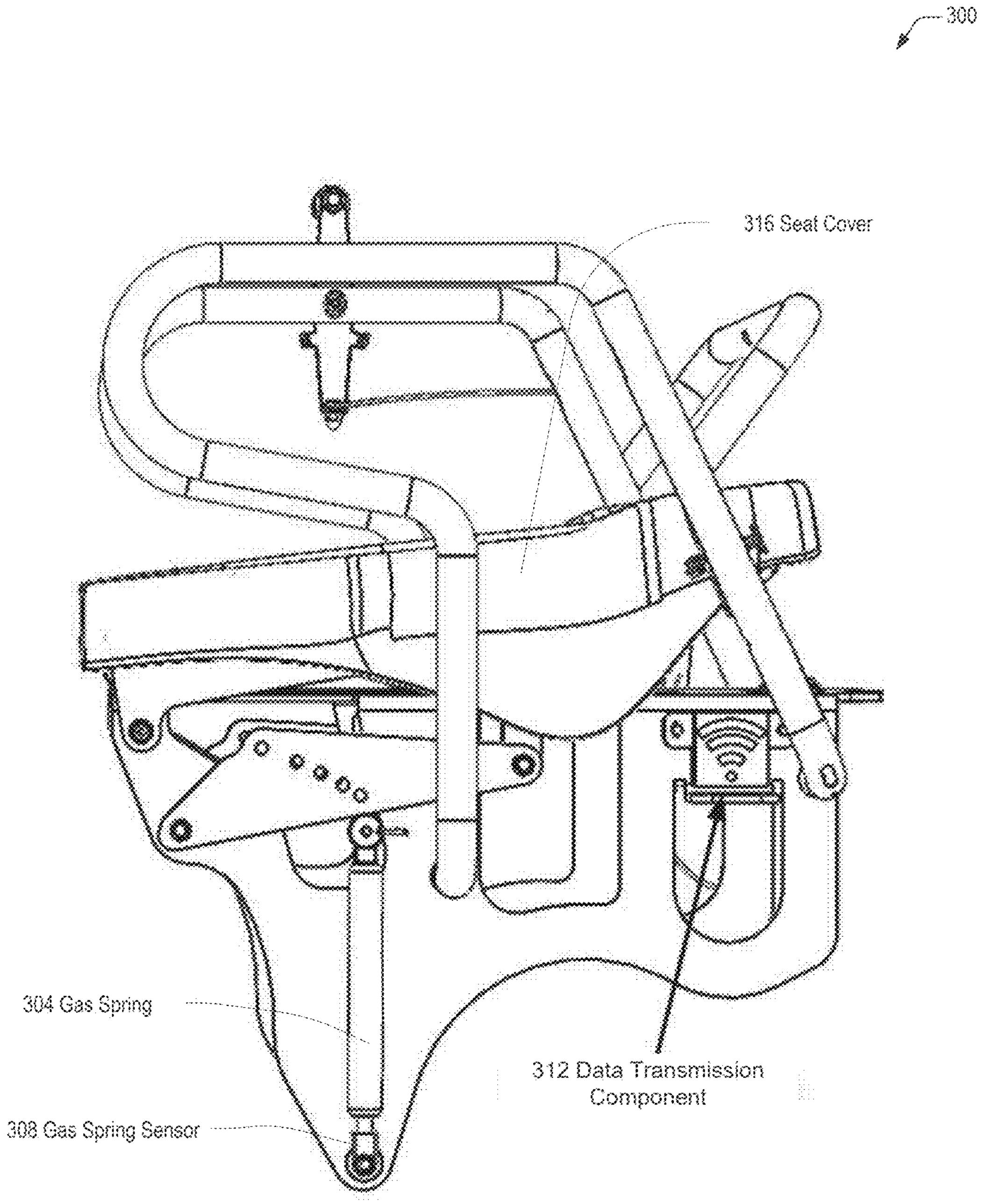
FIG. 3 schematically shows a device for collecting and transmitting sensor data to an analysis system, in accordance with illustrative embodiments of the invention.

FIG. 3 schematically shows a device 300 for collecting and transmitting sensor data to an analysis system in accordance with illustrative embodiments of the invention. As shown in FIG. 3, the apparatus includes a device that collects signals from the two IR proximity sensors 112, 116 and the accelerometer(s) 204, 208. This device transmits the collected sensor data 312 to a computing system, such as a cloud-based 3rd party system, among other things, for further analysis and processing.

Figure 4:
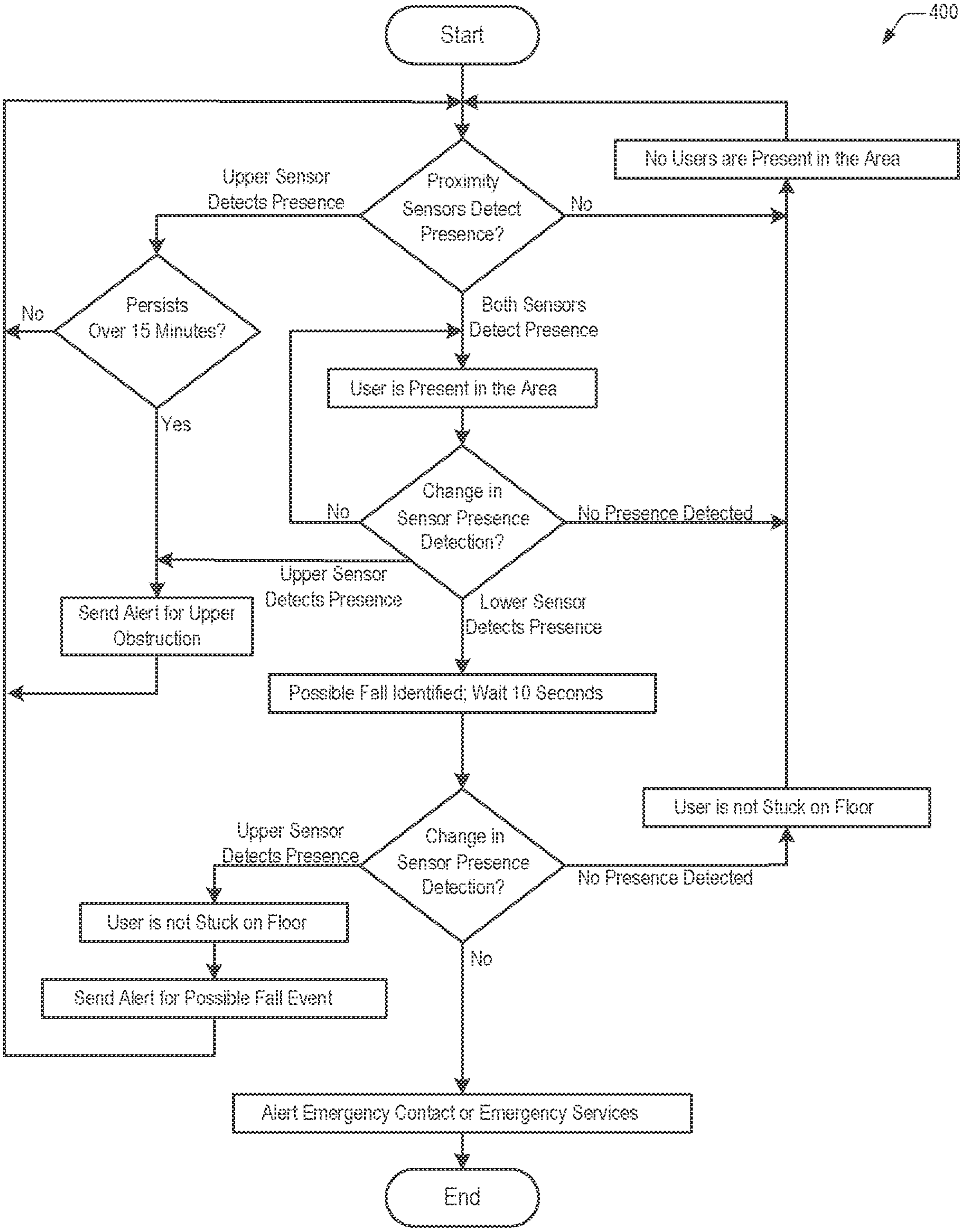
FIG. 4 schematically shows a flowchart of a fall detection process using upper and lower proximity sensors, in accordance with illustrative embodiments of the invention.

FIG. 4 schematically shows a flowchart of a fall detection process 400 using upper and lower proximity sensors in accordance with illustrative embodiments of the invention. FIGS. 4-8 show exemplary processes for operating an assistive toilet lift 108. These processes may be implemented in whole or in part in one or more of the assistive toilet lift 108 systems disclosed herein. In certain forms the functionalities may be performed by a combination of separate cloud devices and/or user devices of the assistive toilet lift system 108. In certain forms all functionalities may be performed by the same device. It shall be further appreciated that a number of variations and modifications to one or more of the processes are contemplated including, for example, the omission of one or more aspects of the process, the addition of further conditionals and operations, or the reorganization or separation of operations and conditionals into separate processes.

Referring to FIG. 4, possible fall events may be detected using the upper and lower proximity sensors or one or the other. In the event that the upper sensor 112 stops detecting a presence, while the lower one 116 continues to do so, a fall is suspected. If this continues for more than a brief period, such as greater than 10 seconds, or between 10-60 seconds, among other things, an emergency alert is pushed to linked mobile devices to emergency services, depending on the user's settings.

Figure 5:
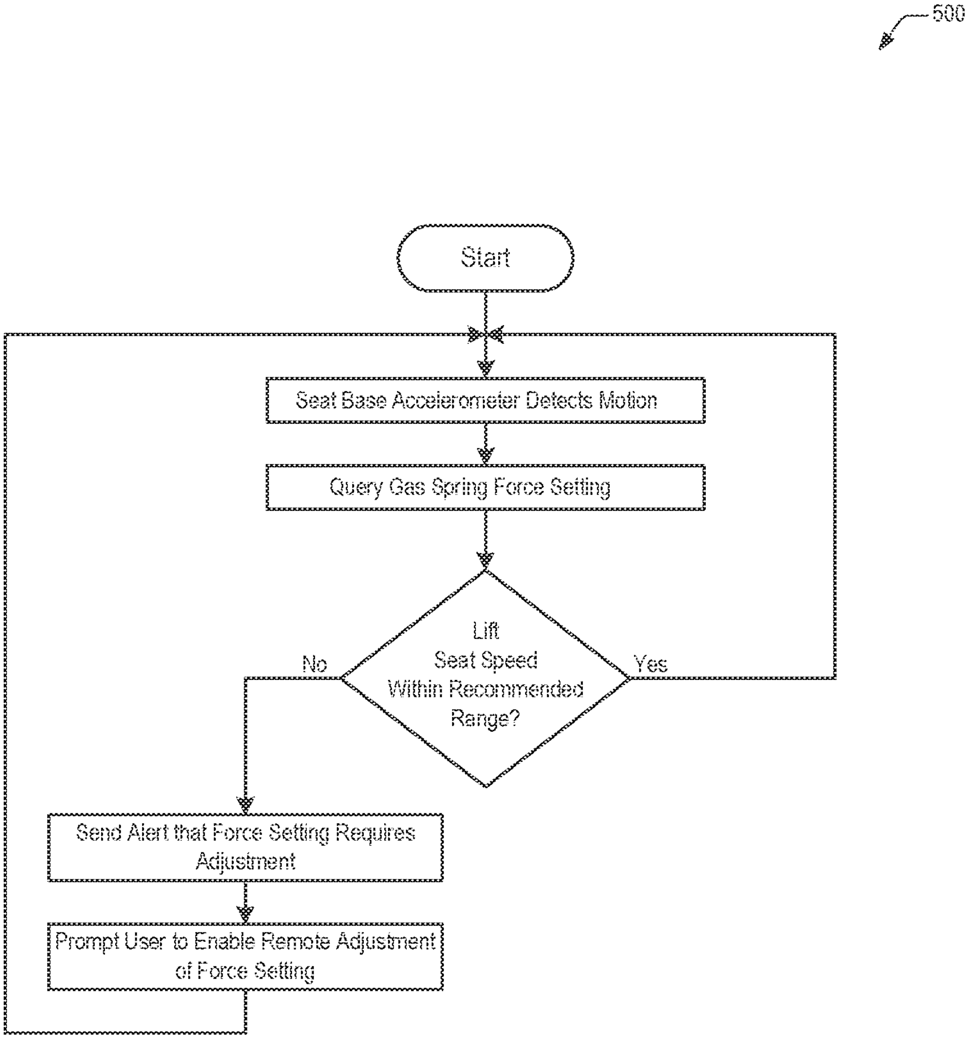
FIG. 5 schematically shows a flowchart of a remote adjustment process for gas spring force settings, in accordance with illustrative embodiments of the invention.

FIG. 5 schematically shows a flowchart of a remote adjustment process 500 for gas spring force settings in accordance with illustrative embodiments of the invention. The analysis system enables remote identification of the current force setting of the gas spring 304. Moreover, users can remotely adjust the gas spring force based on their preferences through the web-based interface. Users may be prompted to adjust the gas spring force setting if the lift seat speed is below or above the recommended range. The recommended range may be based on a maximum operating time limit to complete a lifting action or a closing action, or angular speed maximum during one of the actions, among other things.

Figure 6:
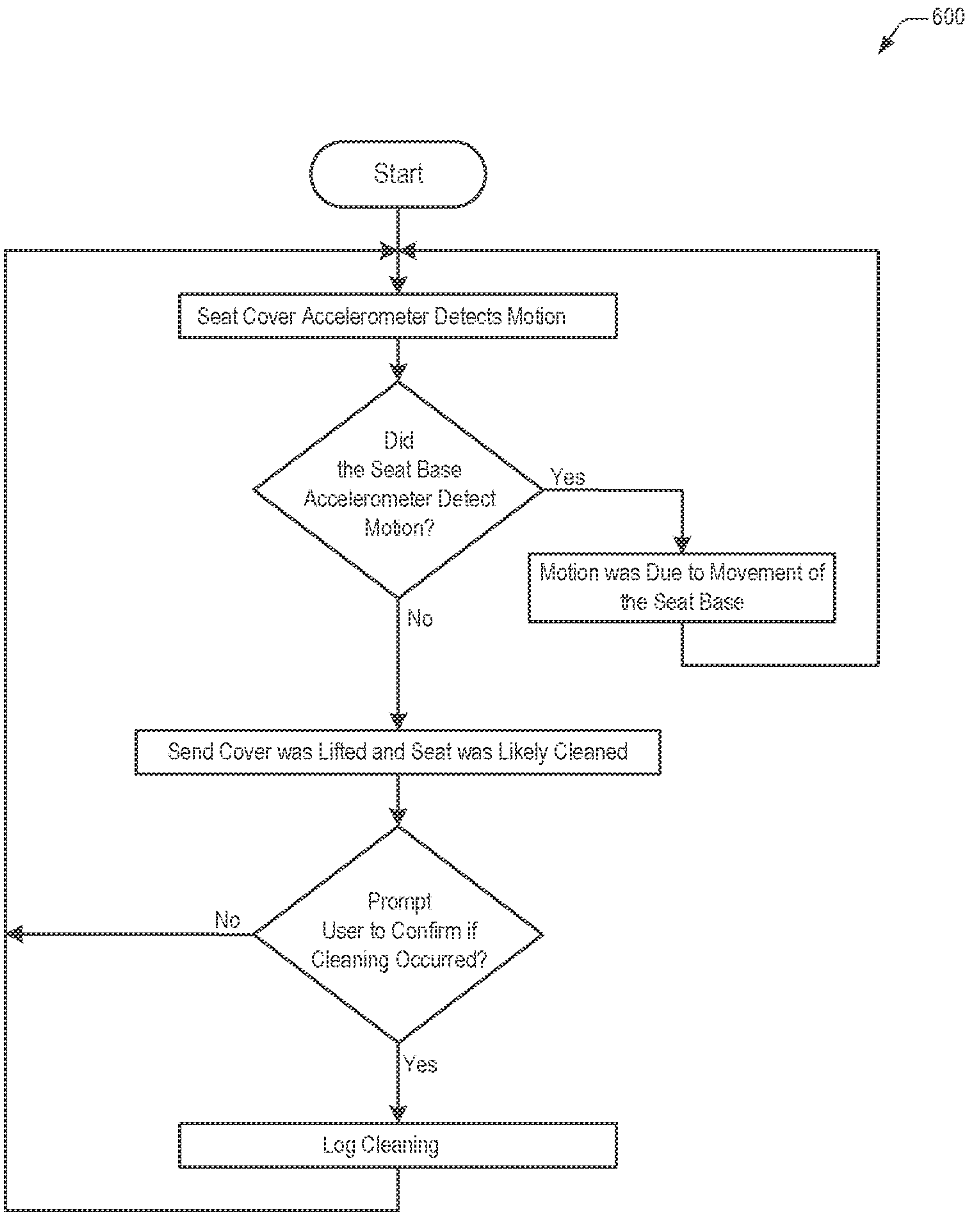
FIG. 6 shows a flowchart of a seat cover movement detection process for tracking the frequency of seat cleanings, in accordance with illustrative embodiments of the invention.

FIG. 6 shows a flowchart of a seat cover movement detection process 600 for tracking the frequency of seat cleanings in accordance with illustrative embodiments of the invention. The accelerometer located in the front of the lift seat cover 316 may be used to detect movement of the lift seat cover 316 independent from movement of the entire lift seat base. The lift seat cover 316 is typically only opened when the lift 108 and/or toilet 104 is cleaned. Consequently, whenever the cover 316 is detected being opened, users can assume that a cleaning occurred. Users are additionally prompted by the device to confirm that cleaning actually occurred before it is logged.

Figure 7:
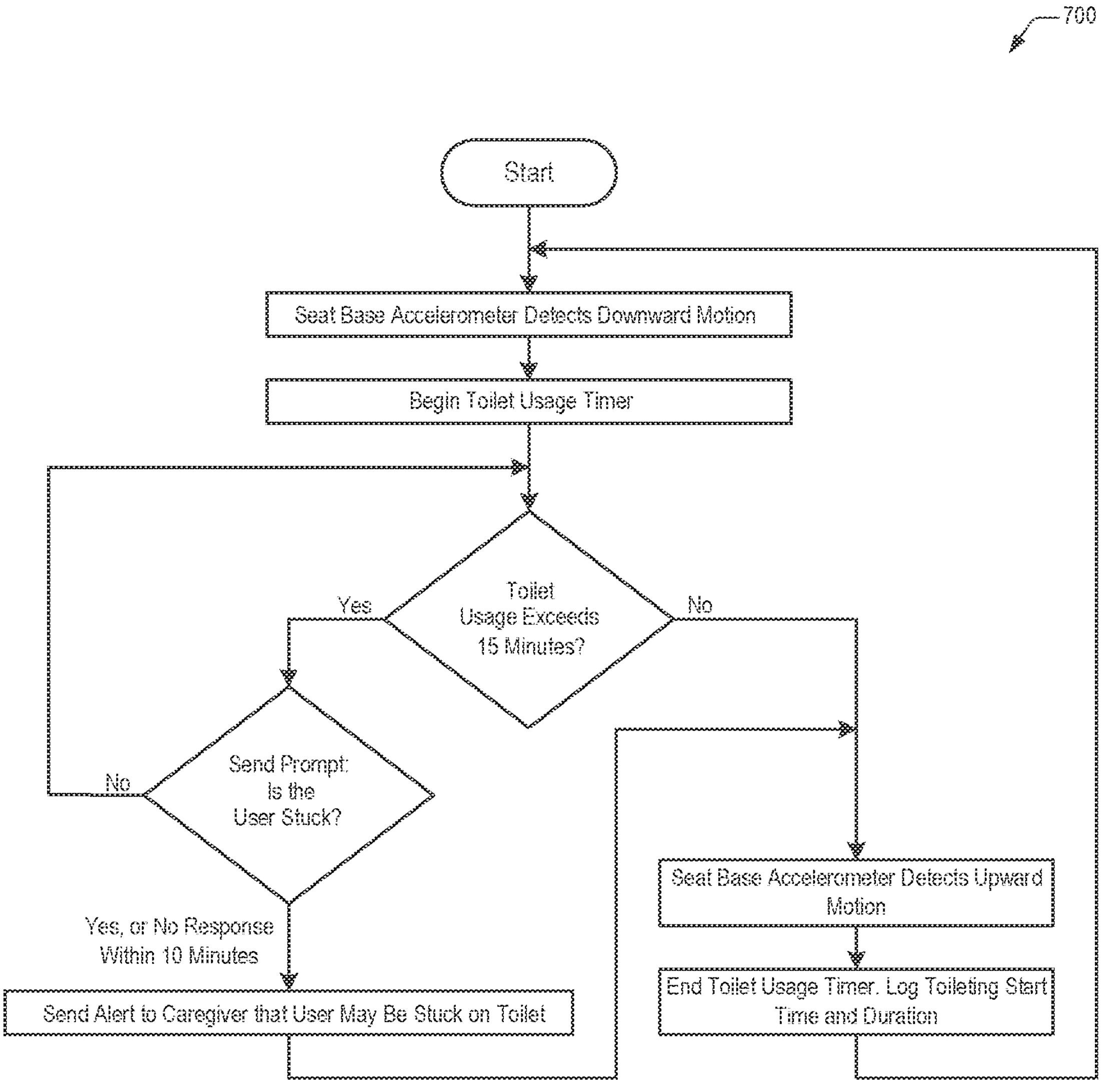
FIG. 7 shows a flowchart of a toilet usage frequency and duration tracking process in accordance with illustrative embodiments of the invention.

FIG. 7 shows a flowchart of a toilet usage frequency and duration tracking process 700 in accordance with illustrative embodiments of the invention. The accelerometer located in the rear of the lift seat base 208 may be used to detect and measure movement of the Lift Seat Base which occurs when the seat is depressed by an applied force. The lift seat base is typically only depressed by a user's body weight when they sit on the seat. Consequently, whenever downward seat movement is detected, the toilet 104 is assumed to be in use.

Recording of the duration of the toilet 104 usage until upward motion of the lift seat base 208 then begins. If the duration exceeds a typical length, users are prompted by the device to confirm that they are not stuck on the toilet and can safely dismount without assistance. If the user does not respond, a caregiver is alerted that assistance is required. In some embodiments, determining to send an alert is based on historical data. For example, the system may determine to send an alert by determining differences between current data and historical data, such as average time spent on toilet 104, or frequency of use, among other things.

Figure 8:
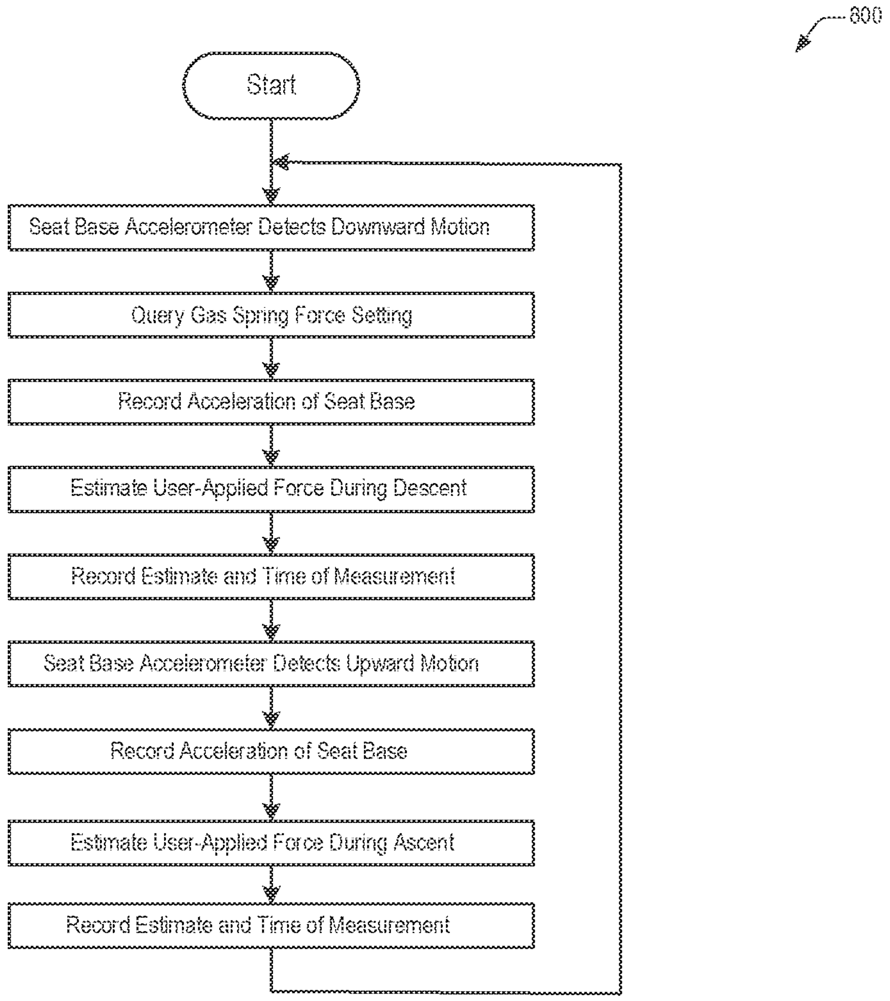
FIG. 8 shows a flowchart of a user applied force estimation process based on seat base acceleration, in accordance with illustrative embodiments of the invention.

FIG. 8 shows a flowchart of a user applied force estimation process 800 based on seat base acceleration in accordance with illustrative embodiments of the invention. The accelerometer located in the rear of the lift seat base 208 is used to measure the acceleration and speed of the lift seat base when in use. The acceleration of the seat's lowering motion is a function of the resistive force applied by the gas spring 304 and the user applied force (UAF). The UAF is a combination of the user's weight and the strength applied by the user to sit or stand. The resistive force of the gas spring 304 is a known quantity determined by the spring model and setting.

The UAF during sitting and during standing can be solved for and tracked. Changes in average UAF may indicate a change in the user's weight or mobility. Higher UAF values during descent indicate that a patient has gained weight or is no longer using their muscles (by applying weight on the lift's handlebars or their legs) to slow their descent. Lower UAF values during ascent indicate that a patient has lost weight or has decreased mobility. Changes in the UAF signal to caregivers that further a patient's health requires further evaluation.

Figure 9:
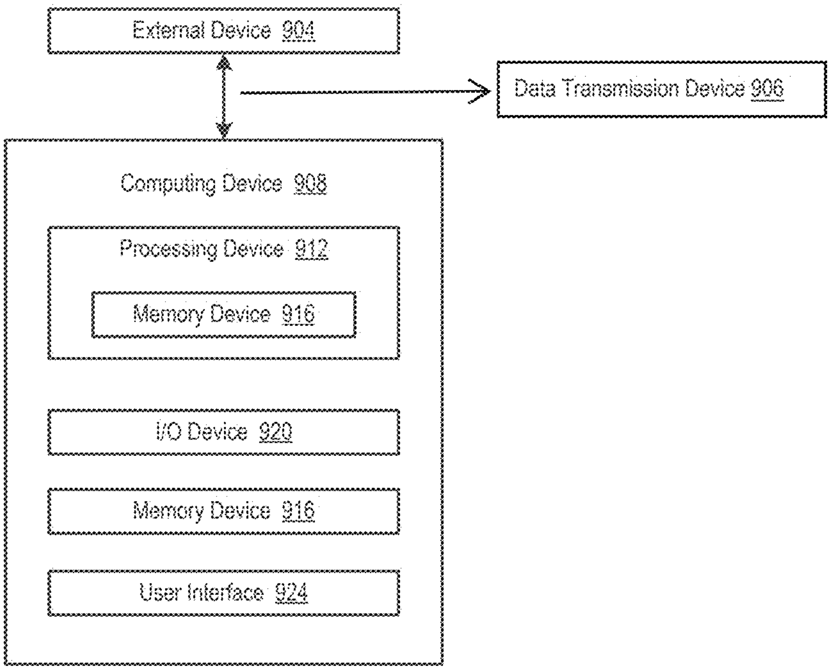
FIG. 9 shows a data transmission device and a computing device, among other devices, in accordance with illustrative embodiments of the invention.

FIG. 9 shows an analysis system, alternatively referred to herein as a computing device 908, in accordance with illustrative embodiments of the invention. The computing device 908 is one component of a toilet lift system used to perform one or more operations of the processes illustrated in FIGS. 4-8. The computing device 908 includes a processing device 912, an input/output device 920, and one or more memory devices 916. The computing device 908 may be a stand-alone device, an embedded system, or a plurality of devices configured to perform the functions described with respect to one of the components of the assistive toilet lift 108. Furthermore, the computing device 908 may communicate with one or more external devices 904, including the sensors, for example through data transmission device 906, such as a WIFI transmitter positioned on the toilet lift though other methods known to those of ordinary skill in the art. Suitable embodiments of the WIFI transmitter include a BlueTooth Gateway. The computing device may be a remote server where the algorithms and software of the present invention are running. The remote server may be cloud-based system operated by a 3rd party. The computing device may also be located within the setting where the toilet lift is in use, including a hospital or home setting and/or positioned on the toilet lift itself. The computing device 908 can also communicate with caregivers by sending signals to their mobile phones or computers through text or email, including over the internet or an internet service.

The input/output device 920 enables the computing device 908 to communicate with an external device 904. For example, the input/output device 920 may be a network adapter, a network credential, an interface, or a port (e.g., a USB port, serial port, parallel port, an analog port, a digital port, VGA, DVI, HDMI, FireWire, CAT 5, Ethernet, fiber, or any other type of port or interface), among other things. The input/output device 920 may be comprised of hardware, software, or firmware. The input/output device 920 may have more than one of these adapters, credentials, interfaces, or ports, such as a first port for receiving data and a second port for transmitting data, among other things.

The external device 904 may be any type of device that allows data to be input or output from the computing device 908. For example, the external device 904 may be a meter, a control system, a sensor, a mobile device, a reader device, equipment, a handheld computer, a diagnostic tool, a controller, a computer, a server, a printer, a display, a visual indicator, a keyboard, a mouse, or a touch screen display, among other things. Furthermore, the external device 904 may be integrated into the computing device 908. More than one external device 904 may be in communication with the computing device 908. In one embodiment, the external device 904 may be a 3rd party, cloud-based, or other form of analysis system. In one embodiment, the computing device 908 receives signals from one or more proximity sensors 112, 116 and transmits those signals to the analysis system for analysis and processing. In one embodiment, the analysis system compares data from the one or more proximity sensors 112, 116 to data models of assistive toilet lift 108 user falls to determine if a fall has likely occurred. In one embodiment, the analysis system enables prompt assistance and support by communicating with caregivers or emergency services in response to the analysis system predicts a fall event for a user.

The processing device 912 may be a programmable type, a dedicated, hardwired state machine, or a combination thereof. The processing device 912 may further include multiple processors, Arithmetic-Logic Units (ALUs), Central Processing Units (CPUs), Digital Signal Processors (DSPs), or Field-programmable Gate Arrays (FPGA), among other things. For forms of the processing device 912 with multiple processing units, distributed, pipelined, or parallel processing may be used. The processing device 912 may be dedicated to performance of just the operations described herein or may be used in one or more additional applications. The processing device 912 may be of a programmable variety that executes processes and processes data in accordance with programming instructions (such as software or firmware) stored in a memory device 916. Alternately or additionally, programming instructions are at least partially defined by hardwired logic or other hardware. The processing device 912 may be comprised of one or more components of any type suitable to process the signals received from the input/output device 920 or elsewhere and provide desired output signals. Such components may include digital circuitry, analog circuitry, or a combination thereof.

Memory devices 916 in different embodiments may be of one or more types, such as a solid-state variety, electromagnetic variety, optical variety, or a combination of these forms, to name but a few examples. Furthermore, memory devices 916 may be volatile, nonvolatile, transitory, non-transitory or a combination of these types, and some or all of memory devices 916 may be of a portable variety, such as a disk, tape, memory stick, or cartridge, to name but a few examples. In addition, memory devices 916 may store data which is manipulated by the processing device 912, such as data representative of signals received from or sent to the input/output device 920 in addition to or in lieu of storing programming instructions, among other things.

As shown in FIG. 9, memory devices 916 may be included with the processing device 912 or coupled to the processing device 912 but need not be included with both. It is contemplated that the various aspects, features, processes, and operations from the various embodiments may be used in any of the other embodiments unless expressly stated to the contrary. Certain operations illustrated may be implemented by a computer executing a computer program product on a non-transient, computer readable storage medium, where the computer program product includes instructions causing the computer to execute one or more of the operations, or to issue commands to other devices to execute one or more operations.

In one embodiment, computing device 908 may include a user interface 924 to control a means for remotely adjusting the force setting of the gas spring 304, where an adjustment of the gas spring 304 may be controlled through user inputs to the user interface 924. The user interface 924 may also display a current setting from a gas spring sensor 308, data from a proximity sensor 112, 116, or data from an accelerometer 204, 208.

The apparatus disclosed herein may incorporate IR sensor technology, accelerometers, or a web-based communication system to ensure a secure, controlled, and user-friendly experience. The web-based system may serve as a central hub for processing and analyzing the collected data in order to detect fall events and provide information on user trends.

One of the core objectives of the present application is to promote independence and dignity for users with limited mobility. By providing a reliable and user-friendly mechanism for detecting fall events and ensuring that the attached toilet lift 108 is properly calibrated, the apparatus empowers individuals to safely perform essential personal hygiene routines without relying heavily on caregiver assistance.

As a user approaches the toilet 104, two infrared (IR) proximity sensors 112, 116, mounted at different elevations on the body 120 of the apparatus, detect the user's presence. One IR sensor 116 may be mounted below the toilet seat on a rigid bar connecting the two lift wings on the left and right sides of the toilet 104. The sensor 116 may be located 11" below the toilet seat and approximately 7" above the ground depending on the toilet seat's height, among other things. The second IR sensor 112 may be located on a backrest support bar connecting the lift handles on the left and right sides of the toilet 104. The sensor 112 may be located 9" above the toilet seat and approximately 27" off the ground, depending on the toilet seat's height, among other things.

The two IR sensors 112, 116 form two parallel regions of detection: one horizontal region approximately 3-6 inches above the floor and one approximately two feet above the floor. Detection of a presence within both regions indicates that an individual has approached the toilet 104. Throughout normal use of the restroom, an individual is expected to enter and leave the two regions of detection while using the restroom. While walking upright, the two IR sensors 112, 116 will detect a nearby presence simultaneously in each region.

When a presence is detected by only the lower sensor 116 continuously, that may indicate the presence of a low object (such as a stool or mop bucket) or an animal (such as a dog or cat) in the vicinity. A consistent presence in only the upper sensor 112 region may indicate that an object has been left on the toilet 104 or is otherwise blocking the sensor 112.

In the event of a fall, a unique pattern of detection may occur. First, both IR sensors 112, 116 may continuously detect a presence, indicating a user has approached the toilet 104. Then, the upper IR sensor 112 may stop detecting a presence while the lower IR sensor 116 will continue to do so. If this continues for more than a brief period, that indicates the user has fallen and is stuck on the floor, within the lower sensor 116 region. A high-priority emergency alert is sent to all linked mobile devices. Users then have a brief period to respond to the fall themselves or dismiss the alert as a false alarm. If the alert is not responded to after a brief period of time, then local emergency response services are contacted.

After a fall pattern event, if the upper presence is redetected after a brief period, then there was likely just a brief interruption of detection due to an individual moving their upper body out of the upper region. If the upper presence is redetected after a longer period of time, that likely indicates the user was able to get back up by themselves and does not require further assistance. A low-priority alert may then be sent to linked mobile devices for users or caregivers to dismiss or investigate further. During the lowering process, the accelerometer integrated into the lift seat 204 continuously monitors the lift's 108 speed and motion.

The assistive toilet lift 108 may be integrated with a dedicated mobile application, enabling users to access advanced functionalities and personalize their experience. Users may enter their own weight, adjust their estimated weight, silence an alarm, or select a gas spring 304 setting, among other things. Users may also indicate which weight setting the gas spring 304 is currently on for tracking purposes. For facilities or households with multiple users, the mobile application allows users or caregivers to indicate the number of users who will be using the lift and their respective weights. The software can then identify when each user is using the device based on the speed of lowering in order to track the behaviors of individual users.

Linked devices, such as smartphones or tablets connected to the web-based system, may display graphs and visual representations of lift speed over time generated by the assistive toilet lift system 108. These graphical presentations provide valuable insights into usage patterns, allowing users and caregivers to track trends in lift performance. Increasing or decreasing lift speeds for an individual user indicates that the user is applying more or less force on the lift. This indicates a change in the user's weight or mobility. The mobile application, in collaboration with the web-based system, can also correlate changes in lift speed with a standard profile of gas spring 304 performance. This advanced feature assists in distinguishing changes in user weight as opposed to spring performance over time.

Furthermore, the web-based system tracks essential usage data, including toilet 104 usage patterns, estimated user weight, and seat cover lifting frequency. Seat cover lifting serves as a proxy for cleaning frequency, enabling caregivers to maintain proper hygiene and provide the necessary support and care. Users can remotely identify and adjust the force setting of the gas spring 304 through the web-based interface. This feature provides personalized and convenient adjustments to suit the user's individual requirements and preferences, enhancing their overall experience.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim.

The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" or "a portion" is used, the item can include a portion or the entire item unless specifically stated to the contrary. Unless stated explicitly to the contrary, the terms "or" and "and/or" in a list of two or more list items may connote an individual list item, or a combination of list items. Unless stated explicitly to the contrary, the transitional term "having" is open-ended terminology, bearing the same meaning as the transitional term "comprising."

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims. It shall nevertheless be understood that no limitation of the scope of the present disclosure is hereby created, and that the present disclosure includes and protects such alterations, modifications, and further applications of the exemplary embodiments as would occur to one skilled in the art with the benefit of the present disclosure.

Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. An assistive toilet lift for use with a toilet, comprising:

two or more proximity sensors mounted on a body of the assistive toilet lift;

a data transmission device; and an analysis system, wherein at least one proximity sensor is mounted above a toilet bowl of the toilet and aimed toward a space in front of the toilet, wherein at least one proximity sensor is mounted below the toilet bowl and aimed toward the space in front of the toilet, wherein at least one of the two or more proximity sensors is configured to detect the presence and distance of a user approaching or leaving the assistive toilet lift, wherein the data transmission device receives signals from at least one of the two or more proximity sensors and transmits those signals to the analysis system for analysis and processing, wherein the analysis system compares data from the at least one of the two or more proximity sensors to data models of assistive toilet lift user falls to determine if a fall has likely occurred, wherein the analysis system is configured to communicate with one or more of caregivers or emergency services in response to the analysis system determining a fall has likely occurred.

2. The assistive toilet lift of claim 1, wherein one or more of the proximity sensors is an infrared proximity sensor.

3. The assistive toilet lift of claim 1, wherein the assistive toilet lift is regeneratively powered.

4. The assistive toilet lift of claim 3, wherein the assistive toilet lift is regeneratively powered by a gas spring.

5. The assistive toilet lift of claim 4, further comprising:

a sensor for remotely identifying a force setting of the gas spring, wherein the force setting is communicated to the analysis system for storage and processing.

6. The assistive toilet lift of claim 5, further comprising:

a user interface-a user interface on a computing device, wherein the user interface is configured to receive user inputs for remotely adjusting the force setting of the gas spring.

7. The assistive toilet lift of claim 1, wherein the analysis system comprises a 3rd party, cloud-based system.

8. The assistive toilet lift of claim 1, wherein the analysis system is selected from the group consisting of a local computing device, server, private cloud, or combinations thereof.

9. The assistive toilet lift of claim 1, further comprising:

an accelerometer integrated into a removable lift seat cover;

wherein the accelerometer monitors a lifting speed of the assistive toilet lift and motion of the lift's seat cover during operation, wherein the data transmission device communicates the lifting speed and motion of the assistive toilet lift to the analysis system for storage and processing, wherein the analysis system communicates the lifting speed to one or more of users and caregivers.

10. The assistive toilet lift of claim 9, wherein the analysis system notifies one or more of users and caregivers if one or more weight settings require adjustment as determined by the lifting speed deviating from a preset standard range.

11. The assistive toilet lift of claim 9, wherein seat cover lifting is identified by upward acceleration detected by the accelerometer in response to the assistive toilet lift in a default, unlocked and raised position, wherein the analysis system tracks and communicates data on seat cover lifting frequency as a proxy for cleaning frequency.

12. The assistive toilet lift of claim 9, wherein the analysis system tracks and communicates data on a user's applied force to the assistive toilet lift as determined by acceleration changes of the assistive toilet lift over time.

13. The assistive toilet lift of claim 1, wherein the analysis system tracks and communicates data on toilet usage, including usage frequency and duration.

14. An assistive toilet lift for a toilet, comprising:

one or more proximity sensors;

an accelerometer associated with a seat of the toilet lift;

a data transmission device; and a cloud-based analysis system, wherein the one or more proximity sensors is configured to detect the presence and distance of a user approaching or leaving the assistive toilet lift, wherein the accelerometer monitors a lifting speed of the assistive toilet lift and motion of the seat during operation and is configured to share the lifting speed, motion, or a combination thereof with one or more caregivers, emergency services, or both;

wherein the data transmission device receives signals from the one or more proximity sensors and transmits those signals to the analysis system for analysis and processing, wherein the analysis system compares data from the one or more proximity sensors to data models of assistive toilet lift user falls to determine if a fall has likely occurred, wherein the analysis system is configured to communicate with the one or more of caregivers, emergency services, or both in response to the analysis system determining a fall has likely occurred.

* * * * *